Nov. 5, 1957  J. G. CADILLAC ET AL  2,812,088
AUTOMATIC UNLOADING TRAILER
Filed July 9, 1956  6 Sheets-Sheet 1

INVENTORS
John Cadillac
Robert Cadillac
BY William J. Fox
ATTORNEY

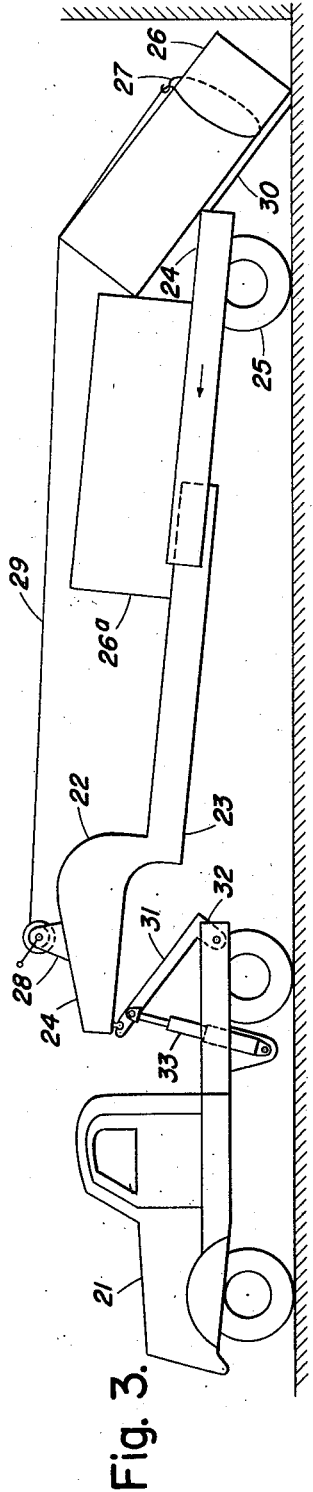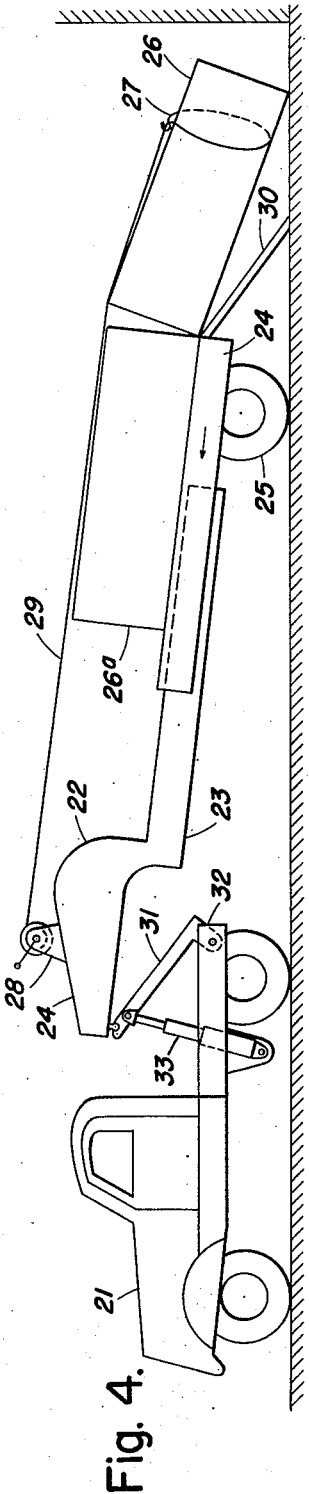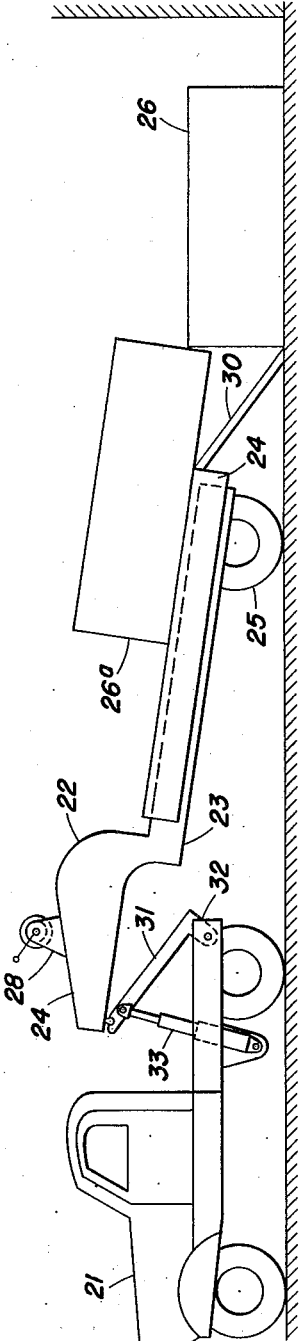

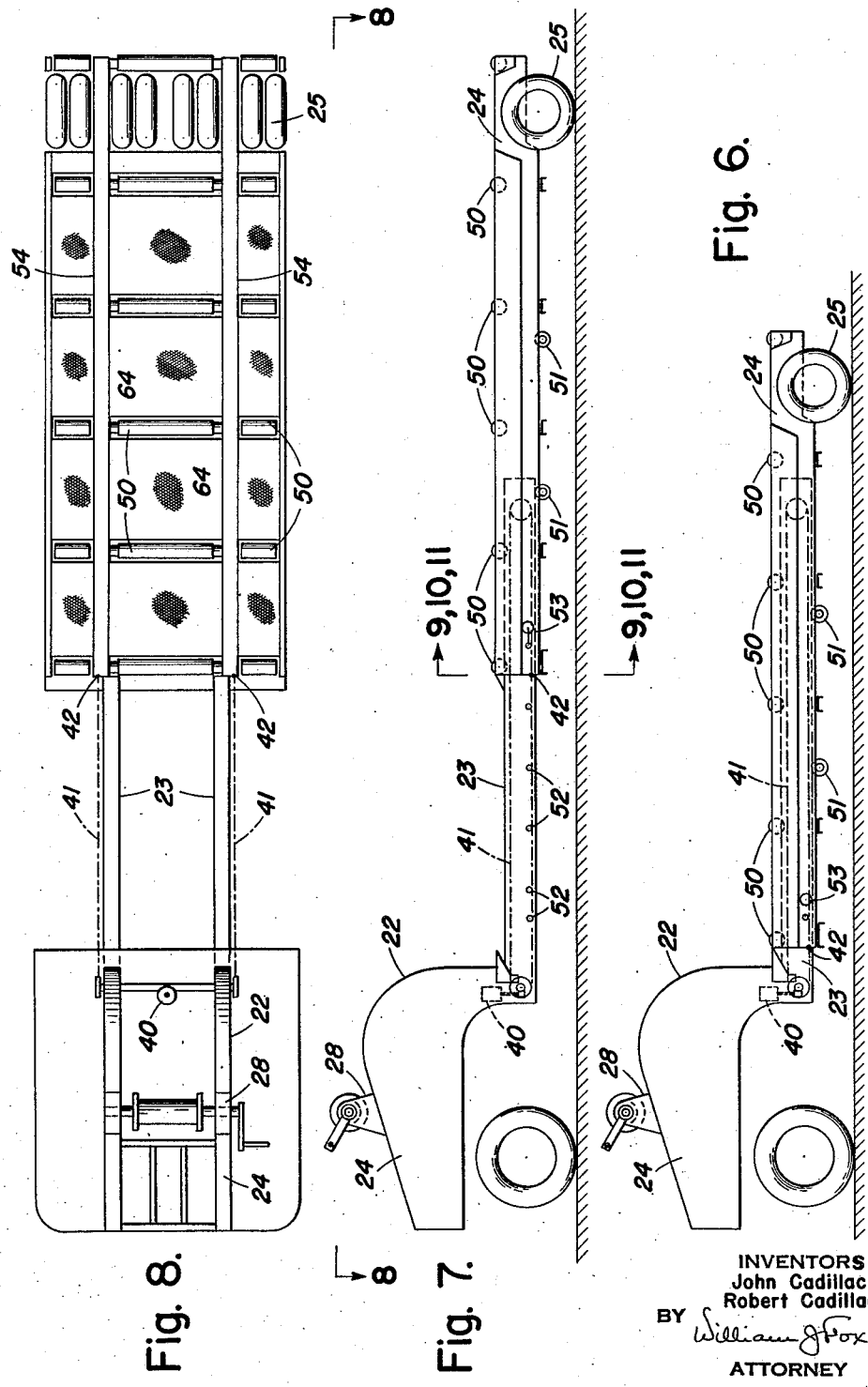

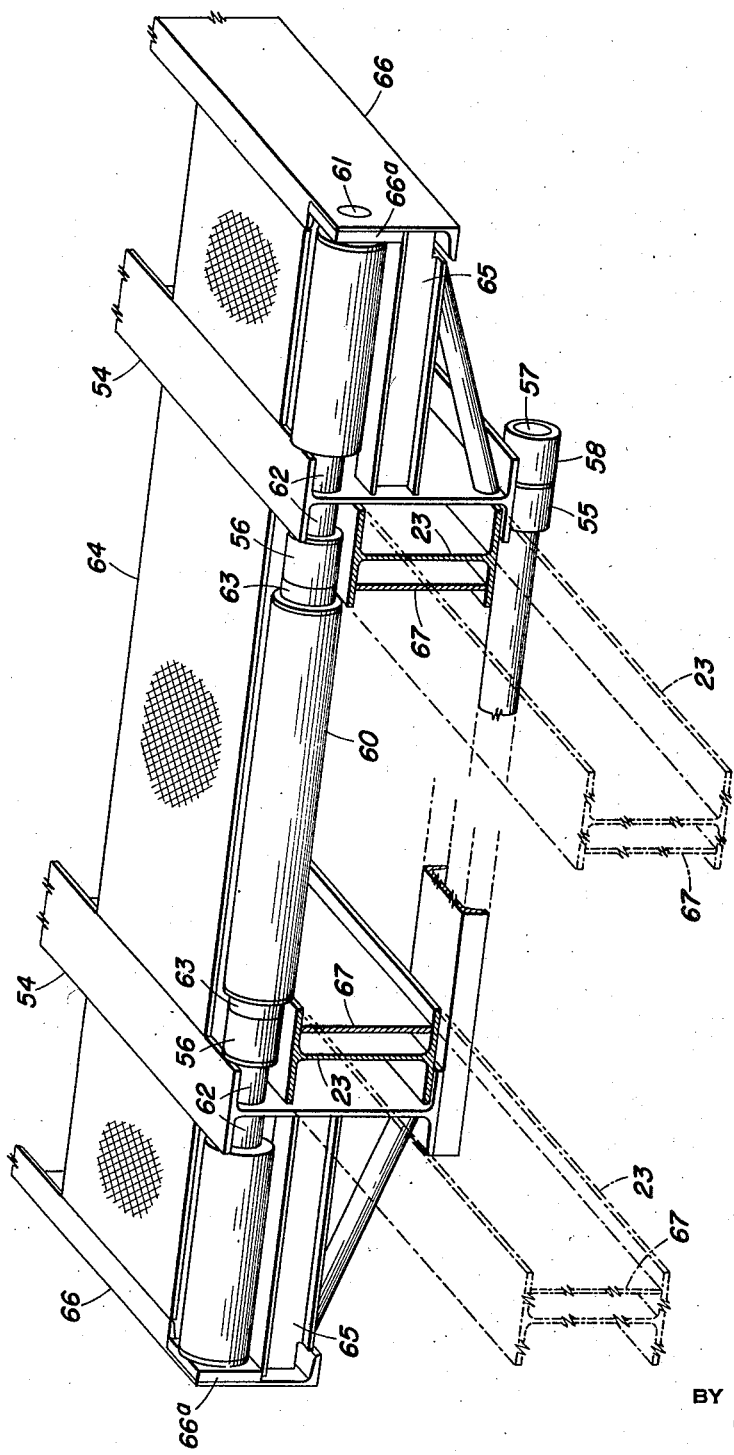

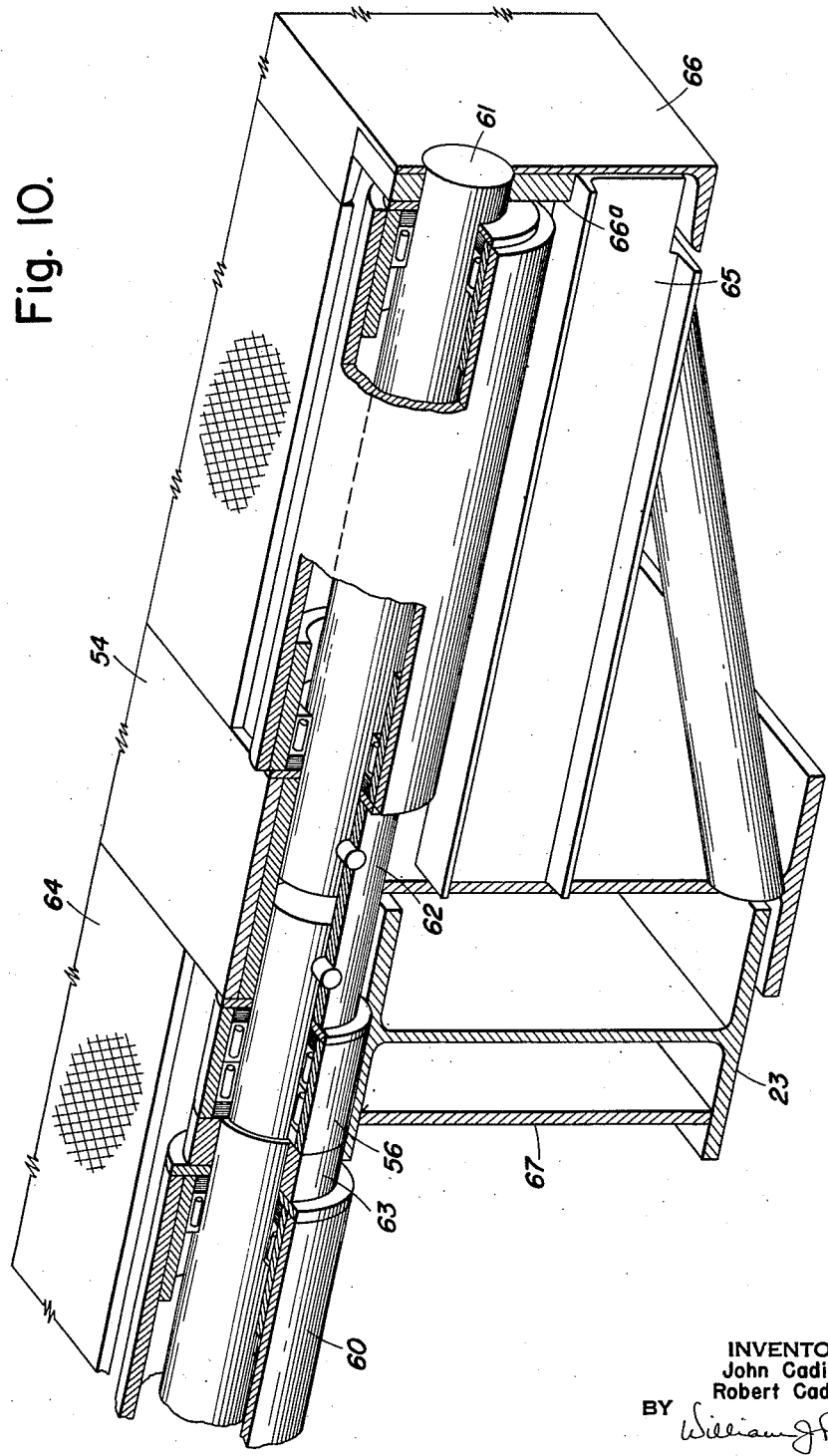

Nov. 5, 1957 J. G. CADILLAC ET AL 2,812,088
AUTOMATIC UNLOADING TRAILER
Filed July 9, 1956 6 Sheets-Sheet 6

INVENTORS
John Cadillac
Robert Cadillac
BY *William J Fox*
ATTORNEY

United States Patent Office 2,812,088
Patented Nov. 5, 1957

2,812,088

AUTOMATIC UNLOADING TRAILER

John George Cadillac, Jersey City, N. J., and Robert Thomas Cadillac, Brooklyn, N. Y., assignors to Aacon Contracting Co., Inc., Brooklyn, N. Y., a corporation of New York Application July 9, 1956, Serial No. 596,739

12 Claims. (Cl. 214—505)

This invention relates to a method for automatically unloading a trailer and to the design of a trailer capable of being so unloaded.

It is not new to have an automatically unloaded trailer or truck. Vehicles have been known which will unload themselves automatically by allowing a load which was extending a distance off the back end of the truck to move further back, upsetting the center of gravity of the truck and causing the front wheels to rise from the ground.

To unload this type of truck, it was necessary to provide a space in back of the truck for the load to extend. This of necessity required a short wheel-base truck, otherwise the total length of load plus truck became prohibitive. This type truck could not carry a very large load and was a dangerous unit to operate as it had to pass through the streets with a large portion of its load extending off its back end. Also, most of the load was concentrated over the rear wheels and very little was distributed to the front wheels.

This invention has as an object a method of unloading a trailer in which the trailer can be backed right up to the space where its load will be deposited and can unload itself without the load necessarily projecting from the trailer.

Another object of this invention is to provide a trailer that will telescope to occupy less space as its load is removed. Space is a critical item in many operations, particularly in unloading on a crowded pier.

Another object of this invention is to provide a telescoping trailer adapted to carry out the foregoing objects.

These and other objects will appear as this specification proceeds.

In summary, this invention accomplishes these objects by providing a semi low-bed trailer, hereinafter referred to as a "trailer," which has a series of rollers mounted in its deck for supporting its load and also one which may be tilted slightly upwardly. When tilted at a slight angle, the load will have a tendency to roll off the back end of the trailer, which it is permitted to do under the control of a winch cable attached to the load. The trailer which is provided with a telescoping body, is then made shorter in length and in effect slides out from under the load.

An understanding of both the details and principles of this invention may best be had by an immediate reference to the drawings which illustrate the preferred mode of application of the principles of this invention and to the following detailed description of this mode of application of this invention.

In the drawings:

Figures 1 through 5 show diagrammatically the steps in the method of automatically unloading a trailer.

Figures 6 and 7 are elevations of the trailer in the telescoped and extended positions, respectively.

Figure 8 is a plan view of a telescoping trailer.

Figure 9 is a section through 9—9 of Figure 7 and shows the relationship and construction of the telescoping members.

Figure 10 shows the deck roller assembly through section 10—10 of Figure 7.

Figure 1:
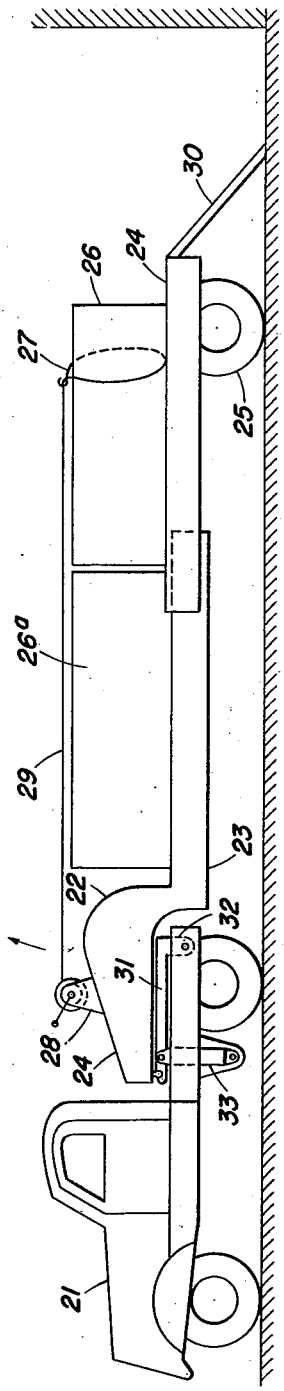
Figure 2:
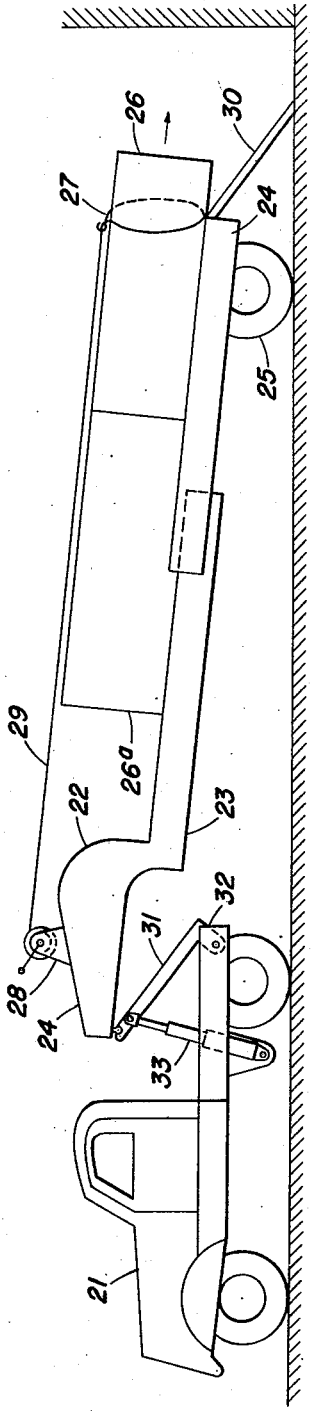

More particularly in the drawings, a truck 20 as shown schematically in Figures 1–5 comprises tractor 21 and flatbed trailer 22. This invention concerns itself with the flatbed trailer. The trailer 22 comprises foresection 23 which is attached to the tractor by means of yoke 24 forming a part of the trailer and telescoping with its rear section 24 which carries the rear wheels 25 shown. Mounted on the trailer is box 26 and box 26a such as the type that would be used to crate an automobile or truck. On the forward portion of the trailer there is shown winch 28 which is used to secure the box 26 during transit and to control its removal from the trailer. The winch is attached to the box by means of cable 29 which loops around the rearward box 26 and hooks onto itself by hook 27. The step-wise procedure for removing a box from the trailer is shown in Figures 1–5. In Figure 1, the trailer is in its extended condition with the two boxes positioned on the trailer. It is now in condition for unloading with the rear ramp 30 in position. In Figure 2, the forward end of the trailer is tilted upwardly in order to cause the boxes to move towards the rear of the trailer. The upward movement is caused by providing a raisable "fifth wheel" 31 on the rear of tractor 21. This term is used normally to designate a wheel-like projection which serves as a means for securing the trailer to the tractor and is well known per se. The fifth wheel 31 pivots at 32 and raises upwardly under the influences of hydraulic jacks 33. In the position shown in Figure 2, the trailer is at an angle to the horizontal and the boxes 26 and 26a move rearwardly under the restraint of cable 29 and winch 28. There are rollers, shown in later figures, in the bed of the trailer on which the boxes roll and which facilitate their movement, both on to and off the trailer. In Figure 3, the rearward box has proceeded to a point where its center of gravity has passed the end of the trailer and it is now supported on the rear ramp 30. When the center of gravity has passed the end of the trailer, the cable 29 must be slacked off slowly to let the box tilt down to rest on the ramp 30. The end corner of the box has now reached the ground or floor. In Figure 4, the trailer has begun to telescope and is pulling itself out from under box 26. At this point the cable begins to go slack as the box levels off. The box remains positioned on the floor or dock supported on one end. Note that in this example the tractor has not been moved throughout this entire operation. It could, therefore, have been either in a straight-away position as shown, or in a jack-knifed position. In Figure 5, the operation has been completed. The trailer has been completely telescoped and the box has slid the remaining distance down the ramp 30 and has been deposited gently to the ground.

An alternative method of unloading would have been to have held the box or boxes in a fixed position and to cause the trailer to telescope out from under the box or boxes until they reached the ground.

The operation has been described above with relation to a single box. It is entirely possible with a trailer as shown to accommodate four or more large boxes with two mounted on the fore-part 23 of the trailer, one on top of the other, and two mounted on the rear-part 24 of the trailer, one on top of the other. The cable 29 in such a position would be secured around the rearward boxes. After the rear box had left the trailer, the other boxes would slide off because of the slope of the trailer bed and would butt against the box that first reached the floor or ground. How many of them could be unloaded would depend on the size of the boxes and the telescoping ability of the trailer. To unload the remaining boxes, of course, the trailer must be moved out straight.

The remaining figures of the drawings show in detail a particular trailer construction adapted to accomplish the invention shown in the earlier figures. In Figure 6, the trailer is shown in its fully telescoped position. The winch 40 is connected to cable 41 which passes over numerous sheaves in a continuous path returning to the winch. This cable is attached to the rear portion of the trailer at any convenient point such as 42 and passes over a grooved drum of the winch. The winch is reversible and thus may be used to cause either an extension or a retraction of the trailer. In place of a winch, a hydraulic or an actuated piston, or either means may be used.

The main supporting beams of the trailer move on upper bearings 50 and lower bearings 51, respectively. The upper bearings 50, in addition, in a novel manner carry rollers shown in detail in Figure 10 which project through the upper deck of the trailer and on which the load is supported. In order to lock the trailer in any given position, holes 52 in forward section 23, at spaced intervals, preferably one every two feet are provided. The rear section carries an air-actuated pin assembly 53 (shown in detail in Figure 11) which moves a pin into holes 52 to lock the trailer in position. This together with the two winches shown may be operated preferably from the mudguard of forward end of the trailer as well as from the tractor cab.

In Figure 9, there is shown in detail a cross-sectional view of the novel bearing assembly for carrying both the load of the trailer and the load of the trailer's cargo.

The telescoping action is caused by a movement of the main beams 23 of the forward section of the trailer into the main beams 54 of the rearward section of the trailer. The main beam 23 moves between an upper bearing 56 and a lower bearing 55. The lower bearing assembly comprises a shaft 57 which spans the width of the trailer and on which is mounted a collar 58 which is welded or otherwise secured to the lower portion of beam 54. Mounted on the shaft is bearing 55 on which the beam 23 rides. The upper flange of beam 23 rolls on bearing 56. The shaft on which bearing 56 is supported comprises a novel arrangement, as it supports both bearing 56 and roller 60. This entire assembly comprises shaft 61 which passes across the entire width of the trailer. Mounted on this shaft are a series of collars 62 which are secured to the beam 54. Next there is positioned the bearing 56. Inwardly on bearing 56 is bearing 63 on which the roller 60 turns. The common shaft 61 therefore supports both the roller 60 and the bearing 56. The roller 60 is so arranged that it extends a short distance (about one-half inch) above the deck 64 of the trailer so that its cargo will be supported on the rollers. Outboard of the main section of the trailer, there are provided two wings. These wings comprise transverse beam 65 and longitudinal beam 66. The shaft 61 extends through these wings and supports outboard rollers 67. Beam 66 is reinforced with plate 66a where the shaft extends through the cutaway portion of beam 66.

The beam 23 has an extra web 67 between its flanges on the inboard side in order to support the extra weight placed thereon by the rollers 56 and 55.

Figure 11:
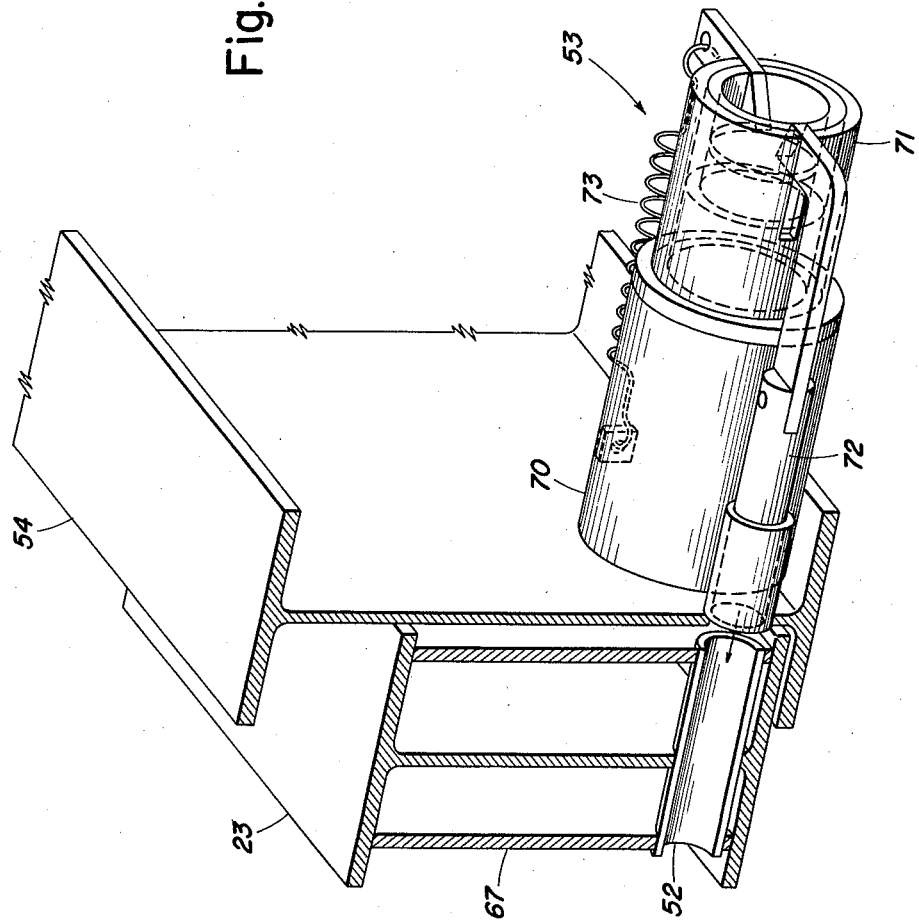
Figure 11 is a sectional elevation of air-actuated locking device.

In Figure 11, there is shown in detail the air-actuated pin assembly 53. The cylinder 70 is attached to a source of compressed air not shown. This serves to actuate piston 71 to which is attached pin 72 which is designed to pass into hole 52. The assembly is normally under spring tension from spring 73 so that the pin is normally in a closed position but can be opened by the application of compressed air.

A typical trailer for carrying out the above described invention has a 30 foot bed which would completely telescope to 20 feet in length. Thus, in its extended condition, there would be an overlap of ten feet in the center portion of the trailer.

We claim:

1. The method of automatically unloading cargo from a trailer which comprises elevating the forward end of the trailer while holding the cargo in a fixed position on the trailer, mutually moving the cargo with respect to the trailer until the cargo touches the ground, and by telescoping the rear end of the trailer into the forward end removing the rear end from under the cargo and permitting the cargo to rest on the ground.

2. The method of automatically unloading cargo from a trailer which comprises elevating the forward end of the trailer while holding the cargo in a fixed position on the trailer, releasing the cargo and restrainedly sliding it off the rear end of the trailer until it touches the ground, and telescoping the rear end of the trailer into the forward end without moving the forward end to remove the rear end from under the cargo and to permit the cargo to rest on the ground.

3. A self-unloading telescoping trailer comprising a forward section with a yoke for attaching to a tractor, attaching means on the yoke, the forward section comprising at least a pair of rearwardly extending beams transversely secured to each other, a rear section comprising at least a pair of forwardly extendng beams transversely secured to each other, one pair of beams being adapted to fit snugly within the other, a plurality of lower bearing means secured on one set of beams and providing antifriction bearing for the other set of beams, a plurality of upper antifriction bearing means each comprising a shaft secured to the forwardly extending beams, a bearing on the shaft with antifriction roller engaging the upper portion of the rearwardly extending beam, a second bearing on the shaft with a roller on the bearing, the roller being of sufficient diameter to project above the deck of the trailer for antifrictionally supporting a load being moved upon and along the deck and actuating means for telescoping the forward and rear sections with respect to each other to extend and contract the length of the trailer while loading and unloading.

4. A self-unloading telescoping trailer comprising a forward section with a yoke for attaching to a tractor, attaching means on the yoke, the forward section comprising at least a pair of rearwardly extending beams transversely secured to each other, a rear section comprising at least a pair of forwardly extending beams transversely secured to each other, one pair of beams being adapted to fit snugly within the other, a plurality of lower bearing means secured on one set of beams and providing antifriction bearing for the other set of beams, a plurality of upper antifriction bearing means each comprising a shaft secured to the forwardly extending beams, a bearing on the shaft with antifriction roller engaging the upper portion of the rearwardly extending beam, a second bearing on the shaft with a roller on the bearing, the roller being of a diameter larger than that of the antifriction roller so as to project above the deck of the trailer for antifrictionally supporting a cargo being moved upon and along said deck, and actuating means carried by the trailer for controllably extending and contracting the length thereof telescopically while loading and unloading, with the addition that there is provided a second set of beams externally attached and parallel to the forwardly extending beams, the said shaft extending through the second set of beams and a roller on the extended shaft of sufficient diameter to project above the deck of the trailer.

5. A self-unloading telescoping trailer comprising a forward section with a yoke for attaching to a tractor, attaching means on the yoke, the forward section comprising at least a pair of rearwardly extending beams transversely secured to each other, a rear section comprising at least a pair of forwardly extending beams transversely secured to each other, one pair of beams being adapted to fit snugly within the other, a plurality of lower bearing means secured on one set of beams and providing antifriction bearing for the other set of beams, a plurality of upper antifriction bearing means each comprising a shaft secured to the forwardly extending beams, a bearing on the shaft with antifriction roller engaging the upper portion of the rearwardly extending beam, a second bearing on the shaft with a roller on the bearing, the roller being of a diameter larger than that of the antifriction roller and sufficiently large to project above the deck of the trailer for antifrictionally supporting a load being moved upon and along said deck, and actuating means carried by the trailer for controllably extending and contracting the length thereof telescopically while loading and unloading, said actuating means comprising an hydraulic cylinder unit attached to the respective sections for telescopically moving the sections with respect to each other.

6. A truck trailer having a tiltable platform frame structure with its front end supported on the truck and its rear end supported on a wheel assembly, and with lifting means effective between the truck and said front end of the structure for raising the same relative to its rear wheel support to establish a slope along which to move the cargo when unloading; in which said frame structure comprises a forward longitudinal component frame and a rearward longitudinal component frame operatively connected with the forward frame in telescopically slidable relationship therewith so that the frame structure can be foreshortened or lengthened whereby the rear wheel assembly is shifted bodily and unitary with said rearward component frame thereby shortening or lengthening the distance between the rear wheel assembly and the truck, with the addition of actuating means carried by said frame structure for controllably shortening or lengthening the same by moving the one component frame relative to the other so that, when unloading cargo down the slope, said rearward component frame is withdrawable from under the cargo to a shortened load relinquishing position, and antifriction roller means effective between said component frames to allow for uninhibited shortening and lengthening of said frame structure by said mechanism while under load.

7. A truck trailer having a tiltable platform frame structure with its front end supported on the truck and its rear end supported on a wheel assembly, and with lifting means effective between the truck and said front end of the structure for raising the same relative to its rear wheel support to establish a slope along which to move the cargo when unloading; in which said frame structure comprises a forward longitudinal component frame and a rearward longitudinal component frame operatively connected with the forward frame in telescopically slidable relationship therewith so that the frame structure can be foreshortened or lengthened, with the addition of actuating means carried by said frame structure for controllably shortening or lengthening the same by moving the one component frame relative to the other so that, when unloading cargo down the slope, said rearward component frame is withdrawable from under the cargo to a shortened load relinquishing position; and in which further the forward component frame comprises a pair of horizontally spaced rigidly interconnected front end beams, and the rearward component frame comprises a pair of rear horizontally spaced end beams rigidly interconnected in a manner to provide a longitudinal boxshaped structure presenting a runway for the longitudinally telescoping movement therein of said forward component frame, bottom antifriction roller means mounted upon and at the bottom of said boxshaped structure for antifrictional movement thereon of the bottom of said front end beams, and upper antifriction roller means mounted upon and at the top of said boxshaped structure for antifrictional operating contact with the top of said front end beams.

8. A truck trailer according to claim 7, in which said upper antifriction roller means comprise a transverse shaft carried by said rear end beams, and an antifriction roller disposed at each end of said shaft adjacent to a respective beam, and an independent roller also on said shaft intermediate said antifriction rollers and of a diameter larger than of said antifriction rollers for antifrictionally supporting a cargo being moved along the platform of the trailer.

9. A truck trailer comprising a horizontal frame structure having its front end supported by the truck and its rear end supported by a wheel assembly, in which the frame structure comprises a forward longitudinal component frame and a rearward longitudinal component frame operatively connected with the forward frame in telescopically slidable relationship therewith so that the frame structure can be controllably foreshortened or lengthened at will whereby the rear wheel assembly is shifted bodily and unitary with said rearward component frame thereby shortening or lengthening the distance between the rear wheel assembly and the truck, and actuating means carried by said frame structure and operable for telescopically shortening and lengthening the same by moving the one component frame relative to the other, together with antifriction roller means effective between said forward and said rearward component frames to allow for uninhibited shortening and lengthening of said frame structure by said mechanism, while under load, said shortening to allow a body of cargo upon the frame structure to extend beyond the rear end thereof sufficiently for overbalancing and unloading the same over said rear end while the truck is stationary.

10. A truck trailer comprising a horizontal frame structure having its front end supported by the truck and its rear end supported by a wheel assembly, in which the frame structure comprises a forward longitudinal component frame and a rearward longitudinal component frame operatively connected with the forward frame in telescopically slidable relationship therewith so that the frame structure can be controllably foreshortened or lengthened at will, and actuating means carried by said frame structure and operable for telescopically shortening and lengthening the same by moving the one component frame relative to the other, in which said actuating means comprise an hydraulic cylinder unit attached to the respective component frames.

11. A truck trailer comprising a horizontal frame structure having its front end supported by the truck and its rear end supported by a wheel assembly, in which the frame structure comprises a forward longitudinal component frame and a rearward longitudinal component frame operatively connected with the forward frame in telescopically slidable relationship therewith so that the frame structure can be controllably foreshortened or lengthened at will, and actuating means carried by said frame structure and operable for telescopically shortening and lengthening the same by moving the one component frame relative to the other to change the distance between the rear wheel assembly and the truck; and in which the forward component frame comprises a pair of horizontally spaced rigidly interconnected front end beams, and the rearward component frame comprises a pair of rear horizontally spaced end beams rigidly interconnected in a manner to provide a longitudinal box-shaped structure presenting a runway for the longitudinally telescoping movement therein of said forward component frame, bottom antifriction roller means mounted upon and at the bottom of said box-shaped structure for antifrictional movement thereon of the bottom of said front end beams, and upper antifriction roller means mounted upon and at the top of said box-shaped structure for antifrictional operating contact with the top of said front end beams.

12. A truck trailer according to claim 11, in which said upper antifriction roller means comprise a transverse shaft carried by said rear end beams, and an antifriction roller disposed at each end of said shaft adjacent to a respective beam, and an independent roller also on said shaft intermediate said antifriction rollers and of a diameter larger than of said antifriction rollers for antifrictionally supporting a cargo being moved along the platform of the trailer.

References Cited in the file of this patent

UNITED STATES PATENTS

| | | |
|---|---|---|
| 1,106,104 | Marx | Aug. 4, 1914 |
| 1,910,398 | Ludington | May 23, 1933 |
| 2,522,385 | Lindsay | Sept. 12, 1950 |
| 2,557,203 | Rehberger | June 19, 1951 |
| 2,613,827 | Van Doorne | Oct. 14, 1952 |
| 2,717,707 | Martin | Sept. 13, 1955 |
| 2,741,383 | Leckert | Apr. 10, 1956 |
| 2,754,987 | Kern | July 17, 1956 |

FOREIGN PATENTS

| | | |
|---|---|---|
| 137,943 | Australia | July 13, 1950 |